United States Patent [19]

Ahmad

[11] Patent Number: 6,029,258
[45] Date of Patent: Feb. 22, 2000

[54] METHOD AND SYSTEM FOR TROUBLE SHOOTING AND CORRECTING COMPUTER SOFTWARE PROBLEMS

[75] Inventor: Arshad F. Ahmad, Bellevue, Wash.

[73] Assignee: Microsoft Corporation, Redmond, Wash.

[21] Appl. No.: 08/947,685

[22] Filed: Oct. 9, 1997

[51] Int. Cl.[7] .................................................. G06F 15/40
[52] U.S. Cl. ............................... 714/46; 714/47; 714/48; 714/26
[58] Field of Search ................................. 714/25, 26, 31, 714/38, 46, 48, 47

[56] References Cited

U.S. PATENT DOCUMENTS

| 5,155,837 | 10/1992 | Liu et al. | 395/500 |
|---|---|---|---|
| 5,282,505 | 2/1994 | Calvert et al. | 395/600 |
| 5,367,667 | 11/1994 | Wahlquist et al. | 395/575 |
| 5,388,252 | 2/1995 | Dreste et al. | 395/575 |
| 5,544,308 | 8/1996 | Giordano et al. | 395/183.02 |
| 5,590,056 | 12/1996 | Barritz | 364/550 |
| 5,634,098 | 5/1997 | Janniro et al. | 395/183.14 |
| 5,826,005 | 10/1998 | Fuller | 385/183.14 |

Primary Examiner—Norman Michael Wright
Attorney, Agent, or Firm—Jones & Askew, LLP

[57] ABSTRACT

A method and system for trouble shooting and correcting computer software problems. A Trouble Shooting System is launched onto a computer when a user of a software application encounters a problem during use of that software application. The Trouble Shooting System includes a Character Interface, a Trouble Shooting Program, and an Internet-based Trouble Shooting site and server. The Character Interface allows the user to select from a menu of problems, or the user may type into the Character Interface a natural language string to identify the problem. The Trouble Shooting Program generates offset values corresponding to the problem identified by the user. The Trouble Shooting program uses the offset values to locate problem solutions in an Information Store of problem solutions. The problem solutions located in the Information Store are passed to the user for implementation of a correction of the problem. If no solution is found in the Information Store, the Trouble Shooting Program may connect the user's computer to the remote Internet-based Trouble Shooting site and server to obtain and download additional problem solutions and tools to the Information Store on the user's computer. If a solution to the problem continues to evade the user, the Trouble Shooting Program then may recommend that the user contact the product support services of the provider of the user's malfunctioning software application.

13 Claims, 7 Drawing Sheets

METHOD AND SYSTEM FOR TROUBLE SHOOTING AND CORRECTING COMPUTER SOFTWARE PROBLEMS

FIELD OF INVENTION

The present invention relates generally to use of computer software, and more particularly, the present invention relates to a method and system for trouble shooting and correcting computer software malfunctions and problems.

BACKGROUND OF THE INVENTION

In recent years, use of computers has expanded greatly to enhance and simplify many aspects of business and play. The expanding role of computers in every day life has hastened a like expansion in the use of a variety of computer software applications which perform numerous functions ranging from computer games to word processing to large scale data manipulation.

Unfortunately, computer software applications often malfunction for a number of reasons. Often a software application user fails to properly install a particular software application or component of a particular software application. Often the user's computer is not configured properly to allow proper operation of a particular software application, and inevitably, some software applications contain problems discovered by the providers of those software applications after they are placed on the market and installed by users. Consequently, such problems typically lead to time consuming, expensive, and annoying downtime of computers while users attempt to ascertain the reason for the problem and attempt to effect a correction.

To handle such problems, providers of software applications typically maintain a staff of product support services personnel to field inquiries from software applications users. However, calling product support services can be a daunting and intimidating task for software applications users. Explaining the exact nature of a software problem is often very difficult for the user. Moreover, such practice not only frustrates the user, but increases costs for the provider of the software applications.

Therefore, there is a need in the art for a cost-efficient and time-saving method and system for trouble shooting computer software problems that allow a user to identify and correct problems encountered during the use of a variety of software programs.

There is also a need in the art for a method and system for providing a user of software programs with a database of problem solutions which may be utilized to provide assistance without the need to contact the product support services personnel of the software providers.

There is further a need in the art for a method and system for obtaining on-line assistance from a remote problem solutions database which may be maintained and updated by the providers of software programs.

SUMMARY OF THE INVENTION

The present invention satisfies the above described needs by providing a method and system for trouble shooting and correcting computer software problems. When a user of a particular software program encounters a problem during use of that software program, the user launches a Trouble Shooting System onto his or her computer. For one aspect of the present invention, the Trouble Shooting System includes a Character Interface, a Trouble Shooting Program, and an Internet-based Trouble Shooting site and server.

The Character Interface allows the user to select from a menu of problems or the user may type into the Character Interface a natural language string to identify the problem. Generally described, the Trouble Shooting Program generates offset values corresponding to the problem identified by the user. The Trouble Shooting Program uses the offset values to locate problem solutions in an Information Store (database) of problem solutions. The problem solutions located in the Information Store are passed to the user for implementation of a correction of the problem.

If no solution is found in the Information Store, the Trouble Shooting Program may connect the user's computer to the remote Internet-based Trouble Shooting site and server to obtain and download additional problem solutions and tools to the Information Store on the user's computer. If a solution to the problem continues to evade the user, the Trouble Shooting Program then may recommend that the user contact the product support services of the user's malfunctioning software application.

More particularly described, one aspect of the present invention provides a method of trouble shooting a computer program problem. The method includes the steps of identifying the problem; generating a data location value corresponding to the problem; and locating a solution to the problem in a database of problem solutions using the data location value. The solution can then be implemented to correct the problem. Identifying the problem can be achieved by receiving, through a user interface, identification information about the problem from a user of the computer program.

Described in greater detail, another aspect of the present invention provides a method of identifying and correcting a computer program problem, including the steps of receiving, at a Character Interface, identification information about the problem, and causing the Character Interface to provide the identification information to a Trouble Shooting Program. The Trouble Shooting Program can generate an offset value corresponding to the identification information. The Trouble Shooting Program can use the offset value to locate a solution to the problem in an Information Store of problem solutions. In turn, a solution to the problem can be implemented by the Trouble Shooting Program.

Receiving identification information through the Character Interface may include receiving a problem identification from a selectable menu of possible problems. Alternatively the Character Interface may receive a natural language string describing the problem.

In another aspect, the Trouble Shooting Program can generate an offset value corresponding to the identification information by (1) sending the natural language string to a Trouble Shooting Engine and (2) causing the Trouble Shooting Engine to send the natural language string to a Natural Language Parser. The Natural Language Parser can parse the natural language string into a list of natural language words. In turn, this list of natural language words can be supplied to a Look-Up Table. This causes the Look-Up Table to generate an offset value for each of the list of natural language words.

The Trouble Shooting Program can implement a solution to the identified problem by providing the solution to a user of the computer program through the Character Interface. If the solution is acceptable to the user, operation of the Trouble Shooting Program is terminated. Alternatively, if the solution is not acceptable to the user, the Trouble Shooting Program can return to the Information Store to obtain a second solution to the problem.

If desired, prior to returning to the Information Store of problem solutions, additional problem solutions can be downloaded to the Information Store. The Trouble Shooting Program then can use the offset value to locate the second solution in the Information Store. Downloading additional problem solutions to the Information Store interfacing the Trouble Shooting Program with a remote server via the Internet and downloading the additional problem solutions from an Internet-based database resident on the remote server.

In another aspect of the present invention, a system for identifying and correcting a computer program problem is provided. The system includes a Character Interface operative to receive identification information about a computer program problem and a Trouble Shooting Program. The Trouble Shooting Program is operative to interface with the computer program and to transfer the identification information for the computer program problem to a Trouble Shooting Engine. In response to an offset value corresponding to the identification information, the Trouble Shooting Program can locate a solution to the problem in a database of problem solutions. This solution can then be implemented to correct the computer program problem.

The Character Interface can provide a user of the computer program a selectable menu of possible computer program problems. Alternatively, the Character Interface can receive from a user of the computer program a natural language string describing the computer program problem. In response, the Trouble Shooting Engine sends the natural language string to a Natural Language Parser. The Natural Language Parser can to parse the natural language string into a list of natural language words. The list of natural language words is output to a Look-Up Table. In response, the Look-Up Table generates an offset value for each of the list of natural language words.

In yet another aspect of the present invention, a method of trouble shooting a computer program problem is provided comprising the steps of launching a Trouble Shooting Program in response to a computer program problem, interfacing the Trouble Shooting Program with the computer program, causing the Trouble Shooting Program to query the computer program for information about the problem, and in response to that information, causing the Trouble Shooting Program to locate a solution to the problem in a database of problem solutions.

The step of causing the Trouble Shooting Program to implement the solution to correct the problem may include causing the Trouble Shooting Program to query the computer program for additional information about the problem. If desired, this step may include providing the solution to a user of the computer program via a character interface.

These and other features, advantages, and aspects of the present invention will be more clearly understood and appreciated from a review of the following detailed description of the disclosed embodiments and by reference to the appended drawings and claims.

DETAILED DESCRIPTION

Figure 1:
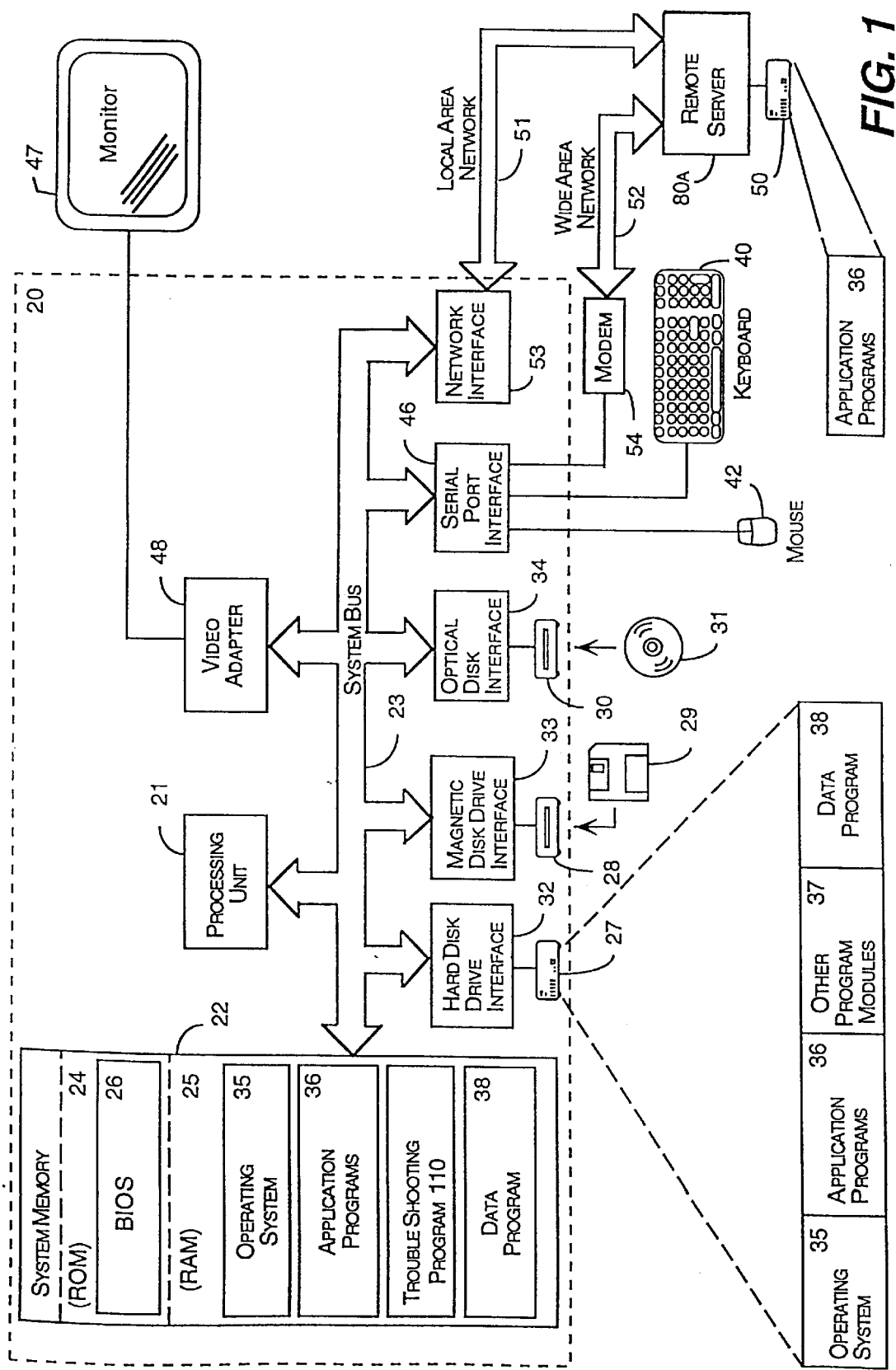
FIG. 1 is a block diagram of a computer that provides a portion of the operating environment for an exemplary embodiment of the present invention.

This invention is directed to a method and system for trouble shooting and correcting problems encountered by users of various computer software applications. As will be understood, the present invention may be used for diagnosing error conditions of a variety of software program modules, such as application programs, operating system modules, Internet browsers, etc. For example, if a user of an application program, such as "WORD," version 8.0, produced by Microsoft Corporation of Redmond, Washington, encounters trouble printing a document, the user may launch the Trouble Shooting System of the present invention and run a diagnostic analysis of the problem encountered. The Trouble Shooting System will isolate the problem and effect a correction for the user. Alternatively, the Trouble Shooting System may instruct the user on how to correct the problem, or direct the user to call the provider of the application program (e.g., Microsoft Corporation) for help from product support services personnel.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, receiving, sending, transferring, transmitting, etc. which are often associated with manual operations performed by a human operator. The operations described herein are machine operations performed in conjunction with various input provided by a human operator or user that interacts with the computer.

Referring now to the drawings, in which like numerals represent like elements throughout the several figures, aspects of the present invention and the preferred operating environment will be described.

Exemplary Operating Environment

FIG. 1 and the following discussion are intended to provide a brief, general description of a suitable computing environment in which the invention may be implemented. While the invention will be described in the general context of a program module, such as a software application, that runs on an operating system in conjunction with a personal computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more program modules 36, other program modules, such as the Trouble Shooting Program 110 of the present invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers. The remote computer may be a server, such as the Internet-based remote Trouble Shooting server 80a, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet, which is illustrated in FIG. 2.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet 60. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

As will be discussed in more detail below, an exemplary embodiment of the present invention provides for the initial downloading of components of the Trouble Shooting System 100 to the user's computer 20 from a remote server 80a via the Internet 60. As will be discussed, subsequent database updates and Trouble Shooting System version updates are obtained from the remote server 80a via the Internet 60.

Figure 2:
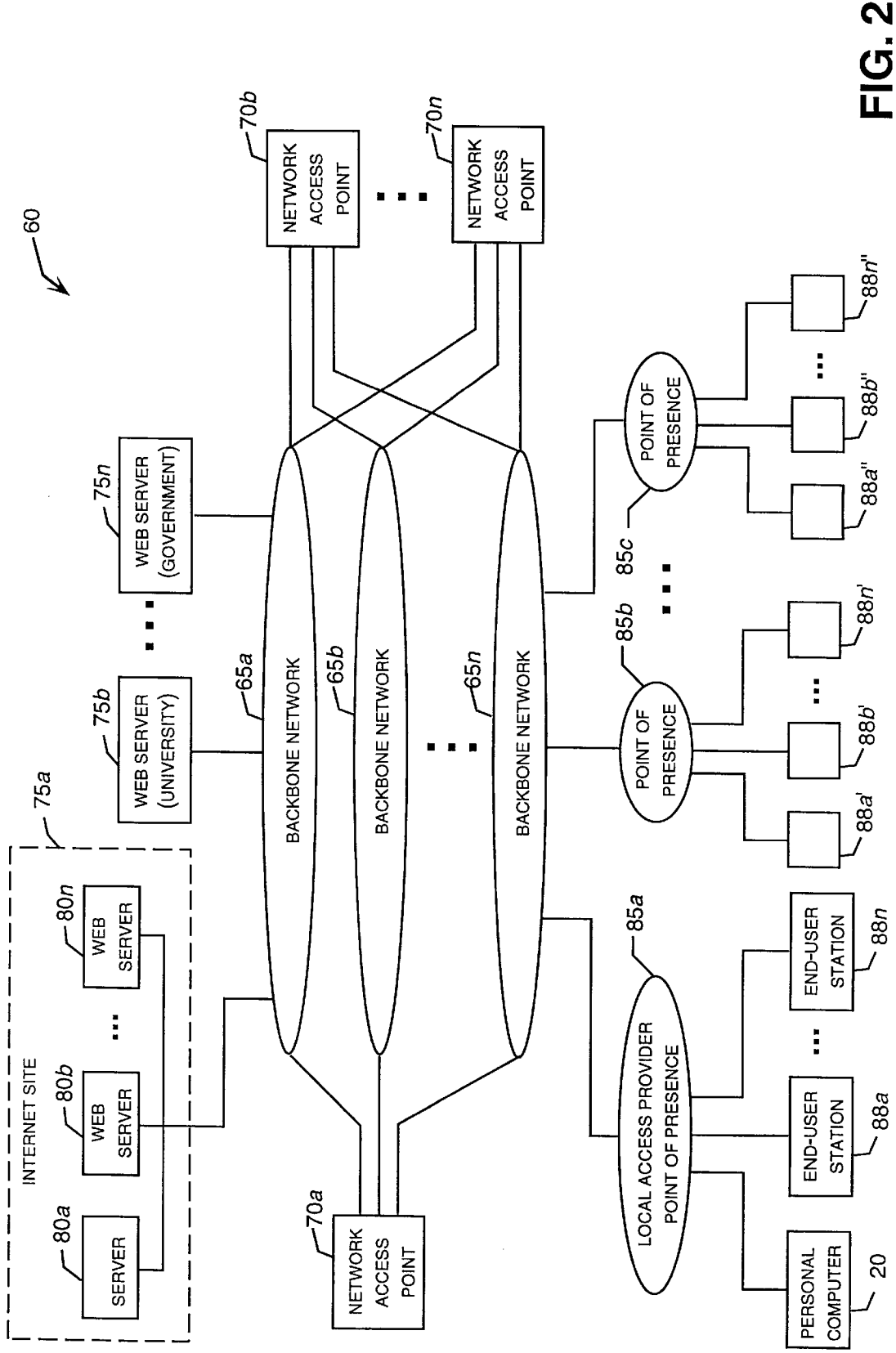
FIG. 2 is a functional block diagram of the Internet representing a portion of the operating environment of an exemplary embodiment of the present invention.

FIG. 2 is a functional block diagram of the Internet 60, a distributed electronic computing network that provides a portion of the operating environment for the preferred embodiment of the present invention. The Internet has in recent years become a mainstream commercial communication resource. E-mail and remote access to computer servers are currently widely used tools for reaching customers. The participants in the Internet are a wide variety of machines, organizations, and individuals, all able to communicate and share information. Physically, the Internet is an interconnected collection of thousands of computer networks, tens of thousands of computers, and tens of millions of individual stations operated by end users. The user of the preferred embodiment of the present invention is preferably such an end-user. As is well known to those skilled in the art, to access an Internet site, an end user need only transmit the site's universal resource locator (URL) created in accordance with the standardized Domain Name System (DNS).

The Internet 60 includes a plurality of backbone networks 65a through 65n. These backbone networks form an international grid of high-speed, high-capacity data communication lines interconnecting a number of massive computers that serve as large-scale processing points or nodes. The backbone networks 65 are interconnected with each other through a plurality of network access points 70a through 70n. These network access points are interfaces through which information is communicated from one backbone network to another. The configuration and operation of the Internet backbone is well known to those skilled in the art and will not be further described herein.

The Internet 60 includes a plurality of Internet sites 75a through 75n. These Internet sites are generally operated by corporations, universities, and governmental organizations. Each Internet site may include one or more repositories of information and resources that may be accessed over the Internet. Each Internet site, as represented by the Internet site 75a, may include a plurality of web servers 80a through 80n. Each of these web servers may provide "home pages" to be visited, files to be read or downloaded, applications to be shared, and the like.

The Internet 60 also includes a plurality of points of presence 85a through 85n that are operated by local access providers. These local access providers are in the business of providing Internet access to end user stations. In the preferred embodiment of the present invention, the personal computer 20, shown in FIG. 1, is an end-user station. As shown in FIG. 2, the point of presence 85a provides Internet access to the personal computer 20 (end user station) and other end user stations 88a through 88n, the point of presence 85b provides Internet access to end user stations 88a' through 88n', etc. All together, the points of presence 85 can provide Internet access to numerous end-user stations 88. Each point of presence 85, and each end user 88, may, but need not, provide home pages for access by others on the Internet 60.

As stated above, the personal computer 20, illustrated in FIG. 1, is also illustrated as an end user station connected to the Internet 60, illustrated in FIG. 2. As will be understood from the following discussion, the Trouble Shooting System 100 of the present invention provides for interaction between Internet-based components of the Trouble Shooting System 100 maintained on the Internet-based Trouble Shooting server 80a (FIG. 2) with local components of the Trouble Shooting System 100 operated on the local computer 20 (FIGS. 1 and 2).

Description of an Exemplary Embodiment

Figure 3:
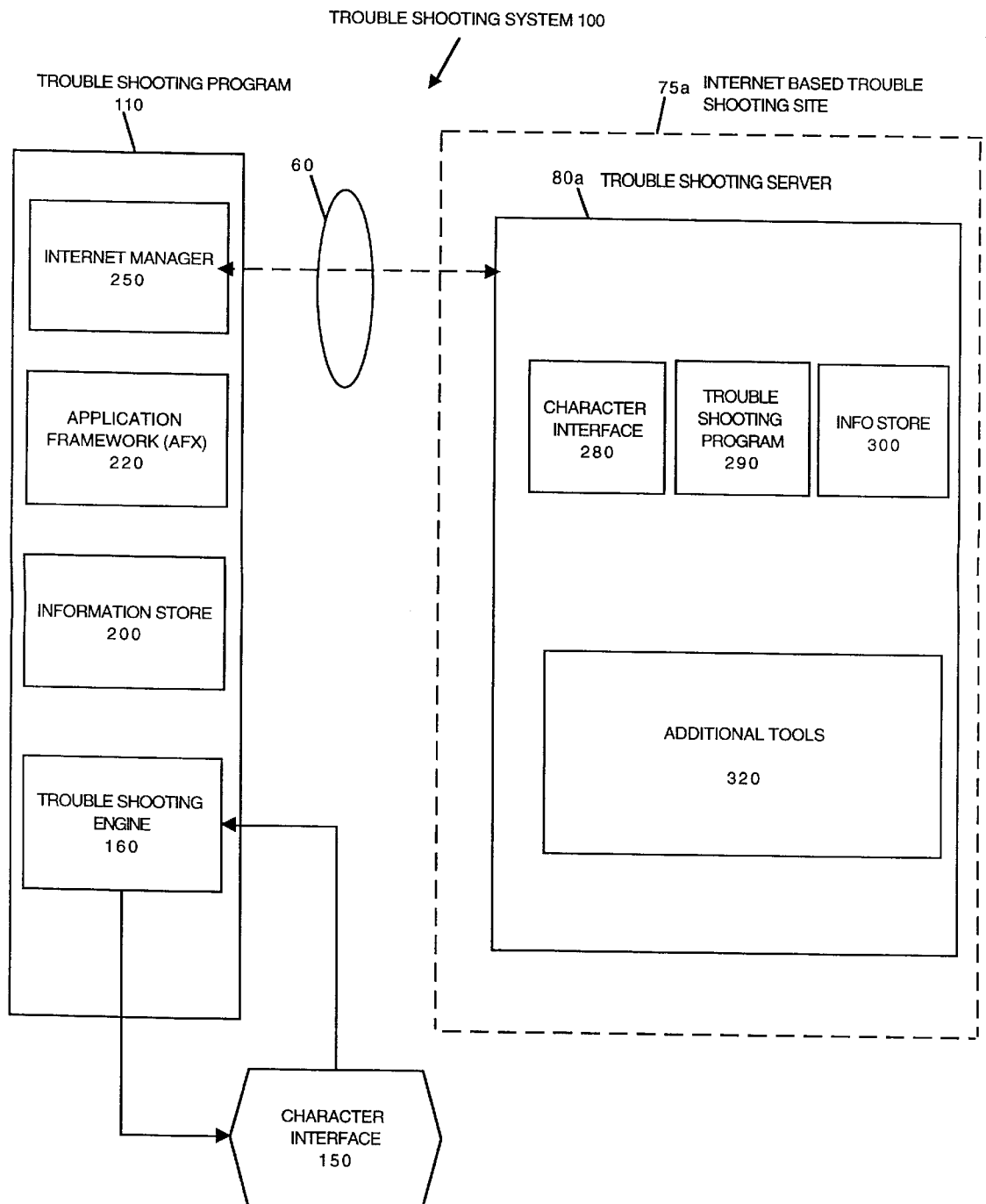
FIG. 3 is a simplified block diagram illustrating the components of an exemplary embodiment of a Trouble Shooting System in accordance with the present invention.

As briefly discussed above, this invention is directed to a method and system for trouble shooting and correcting problems encountered by users of various software applications. Referring now to FIGS. 1, 2, and 3, the Trouble Shooting System (TSS) 100 of the present invention includes a Trouble Shooting Program (TSP) 110, a Character Interface (CI) 150, and an Internet-based Trouble Shooting site 75A. In general when a user encounters some problem with a particular software program 120, such as a print function error, the user may utilize the TSS 100 to assist in identifying and correcting the problem.

In order to utilize the TSS 100, the user typically launches the TSP 110 onto the user's computer 20. Using the CI 150, the TSP 110 obtains information about the software problem from the user. As will be discussed below, the TSP 110 may also obtain information about the software program 120 directly from the software program via communication between the TSP 110 and the application program interfaces (API) of the software program. In the case where the TSP 110 obtains information from the user, the TSP 110, through the CI 150, may provide the user with a menu of typical problems to choose from. In an exemplary embodiment, the user may type a natural language string in response to a TSP 110 inquiry. In the latter situation, the TSP 110 sends the natural language string to a Trouble Shooting Engine (TSE) 160, which is a component of the TSP 110, as illustrated in FIG. 3.

The TSE 160 parses the natural language string and generates a list of offset values corresponding to the problem encountered by the user. The offset values are then passed to an Information Store (IS) 200 where the offset values are used to locate solution information associated with the problem encountered by the user. The TSP 110 uses the problem solution information located in the IS 200 to effect corrections to the software 120, as described above.

When the TSP 110 attempts to locate problem solution information in the IS 200, as described above, the TSP 110 may determine the offset values provided by the TSE 160 do not correspond to a data location contained in the IS 200. Alternatively, the problem solution information located in the IS 200 may not be effective in correcting the problem encountered by the user. If either such event arises, the TSP 110 may request permission from the user to connect the user to the Internet-based Trouble Shooting site 75a. The TSP 110 may update the IS 200 database with information contained in and downloaded from a corresponding Information Store database 300 resident on a Trouble Shooting Server 80a located at the Trouble Shooting site 75a.

Once the TSP 110 receives the required information, it may then effect the changes or instruct the user, as discussed above. If no acceptable solution is found via the Internet-based Information Store 300, or if the user does not give permission to the TSP 110 to connect the user to the Internet site, or if the user does not have Internet capabilities, the TSP 110 will instruct the user to contact a service provider, such as the provider of the malfunctioning software application to discuss the problem with product support services personnel.

The user may install components of the Trouble Shooting System 100, such as the TSP 110 and the CI 150, onto the user's computer 20 using well known software installation media, such as a compact disks or floppy disks. Alternatively, the user may log onto the Internet 60, as described above, and locate the Internet-based Trouble Shooting server 80a at the Trouble Shooting Internet site 75A. As illustrated in FIG. 3, the user may download the local CI 150 from an Internet-based Character Interface 280 and the local TSP 110 from an Internet-based Trouble Shooting Program 290 directly to the user's computer 20. The user may download information from an Internet-based Information Store 300 to the local Information Store 190. The amount of information downloaded to the local Information Store 190 can be determined by the user and may be limited by the memory capacity of the user's computer 20.

As will be understood from the following description, the TSS 100 needs information about the configuration of the user's computer 20 in order to function properly. The first time the user downloads the components of the TSS 100 to the user's computer 20, the TSP 110 will store information about the configuration of the user's computer 20. As is well known to those skilled in the art, the configuration information for the user's computer includes information on the operating system used by the user's computer 20, information on the memory capacity of the user's computer 20, and information on the existence of and configuration of communication paths to available software components. The configuration information stored locally by the TSP 110 can be updated incrementally as the configuration of the user's computer 20 changes.

There are numerous types of problems that can be handled by the TSS 100. Three exemplary types of problems for which the TSS 100 may be used for identification and correction of software application problems include: (1) component existence and path testing; (2) corruption and version testing; and (3) OLE automation framework trouble shooting. It should be understood that these types of problems are exemplary only and do not limit application of this invention from use with other types of problems associated with the use of software applications.

Component existence and path testing includes testing to determine whether all the necessary components of a given software application are present on the computer 20 or whether those components are accessible via the correct communication paths. As is well known to those skilled in the art, most computer operating systems employ some type of registry to keep track of the available components of componentized software applications. For example, a user selects a spell checking function while using a particular word processing application. If an error is returned, the TSS 100 may be used to test for the existence of the spell checking component. If the spell checking component is not present on the user's computer 20, the TSS 100 may be used to identify the problem and to instruct the user on how to install the missing component. Likewise, if a communication path from the user's word processing application to the spell checking component has become corrupted or is incorrectly configured, the TSS 100 can identify the problem and assist the user in effecting a correction.

Corruption and version testing includes testing the integrity of a particular application or file in terms of parity and/or file size. That is, the TSS 100 may be used to quickly identify file or application corruption, by effecting a parity check or file size check. For version testing, componentized software applications typically have several components that may be separately installed. For example, a version of a particular word processor may contain a component for translating Arabic to English. If the user attempts to translate Arabic into English and receives an error condition, the TSS 100 may be used to search for the existence of the proper version of the word processor. That is, the TSS 100 can be used to determine that the version of the word processor employed by the user is prior to the version which contains the component for translating Arabic to English.

OLE Automation framework trouble shooting includes identification and correction of problems with particular software applications where those applications are unable to perform required tasks, for example, printing to an alternate paper orientation.

Figure 4:
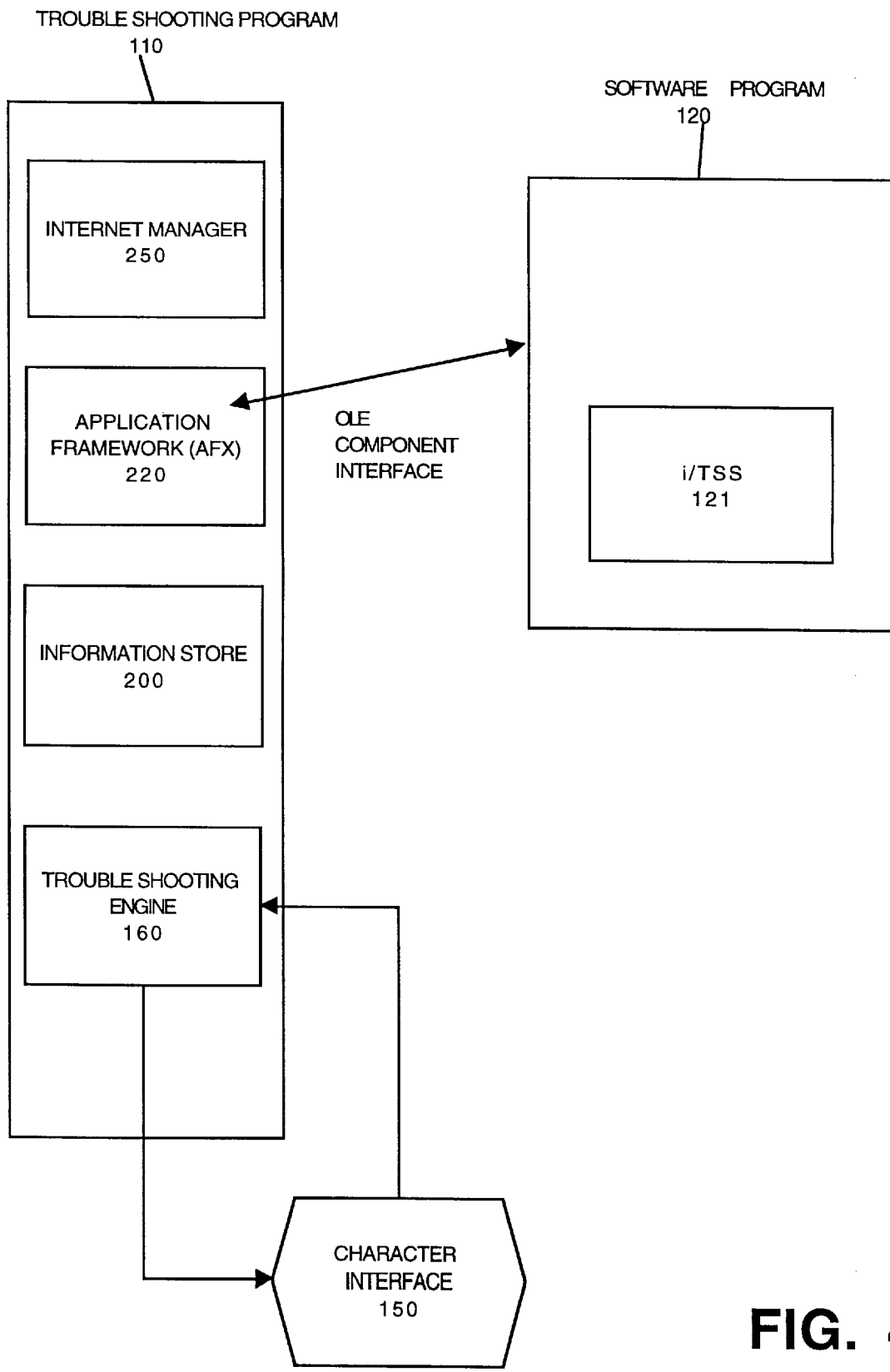
FIG. 4 is a simplified block diagram illustrating the interaction of a Trouble Shooting Program with a software program in accordance with an exemplary embodiment of the present invention.

Referring now to FIGS. 3 and 4, in order for the TSS 100 to identify problems associated with a particular software application, the TSP 110 must interface with that software application. To interface with a particular software application 120 being used by the user, the TSP 110 utilizes the Trouble Shooting System Application Framework (AFX) 220, as shown in FIGS. 3 and 4. As will be understood by those skilled in the art, the AFX 220 is an implementation of an OLE component object. In an exemplary embodiment, the AFX 220 implements OLE component interface support. Methods of communication between two pieces of software using OLE framework are well known to those skilled in the art. FIG. 4 is a simplified block diagram illustrating an exemplary interaction of the TSP 110 with an exemplary software application 120 via the AFX 220. The interface implemented by the software application 120 for communication with the TSP 110 is illustrated in FIG. 4 as the interface/Trouble Shooting System (i/TSS) 121. As should be understood, all applications which will support the TSP 110, or any of its components, must implement OLE component interfaces used by the TSP 110.

Referring still to FIG. 4, the TSP 110 will use the AFX 220 interface (OLE component interface) to get information from the software application 120. For example, if the software application 120 represents a word processing application that is having printing problems, the TSP 110 will query the word processing application, through the AFX 220, to give the TSP 110 a pointer to the software application's trouble shooting printer interface. The TSP 110 will use that interface to resolve the problem, as described below.

Implementation of an Exemplary Embodiment

As briefly discussed above, implementation of the TSS 100 is primarily effected on the user's computer 20 through the CI 150 and the TSP 110. As will be understood by those skilled in the art, the CI 150 is a user interface which allows the user to communicate a problem or error encountered by the user to the TSP 110. In an exemplary embodiment, the CI 150 is downloaded onto the user's computer 20 from the server 80a via the Internet, as described above, as a part of the TSS 100. The CI 150 is preferably implemented as a dynamic-link library module (DLL) or as an Active X/OLE module. These types of modules are well known to those skilled in the art as modules that serve a specific function or set of functions and which may be launched only when needed by a program that calls them.

When the TSS 100 is launched on the user's computer 20, the CI 150 may, in an exemplary embodiment, display an introductory character string such as "Welcome to the Trouble Shooting System." As discussed above, the CI 150 may provide the user with a menu of typical problems to choose from such as "paper out," or the user may type a natural language string such as "I am having printing problems." As is known to those skilled in the art, a natural language string or character string, is a set of characters such as numbers, letters, punctuation marks, or other symbols or control codes. For example, a natural language string may be represented by a computer as one unit of information such as one byte.

Information input by the user through the CI 150, is passed to the Trouble Shooting Program (TSP) 110. As shown in FIG. 3, the TSP 110 includes a Trouble Shooting Engine (TSE) 160, an Information Store (IS) 200, an Application Framework (AFX) 220, and an Internet Manager (IM) 250. Information received by the CI 150 from the user is passed directly to the TSE 160.

Figure 5:
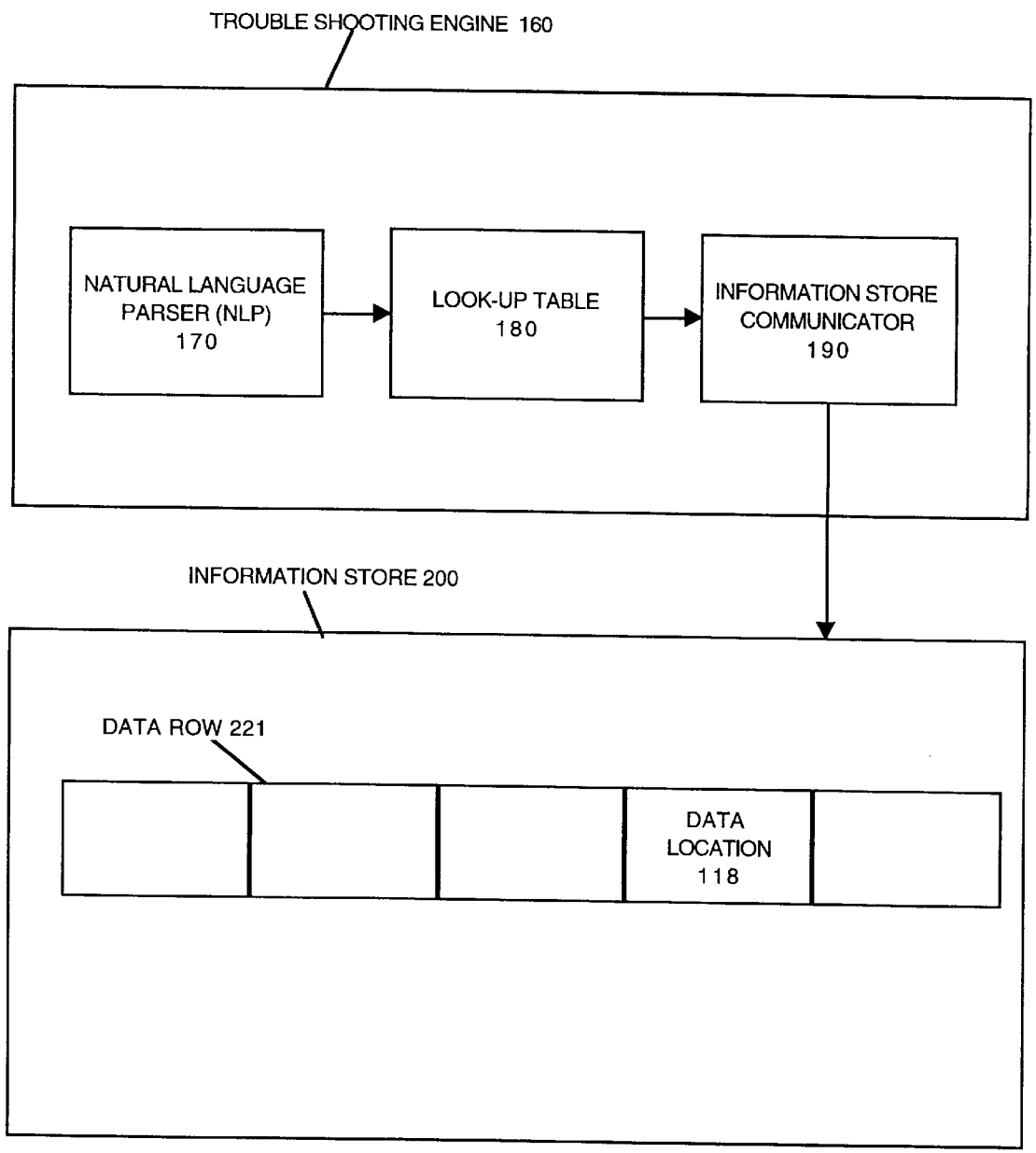
FIG. 5 is a simplified block diagram illustrating the interaction of a Trouble Shooting Engine with an Information Store in accordance with an exemplary embodiment of the present invention.

In an exemplary embodiment, the TSE 160 is tasked with translating the information input by the user through the CI 150 into a set of offset values. The TSP 110 uses the offset values to locate problem solution information in the IS 200 for provision to the user. Referring to FIG. 5, the TSE 160 includes a Natural Language Parser (NLP) 170, a Look-Up Table 180 and an Information Store Communicator 190. If the user inputs a natural language string to describe the problem, the natural language string is passed by the TSP 110 to the TSE 160. The natural language string is then passed by the TSE 160 to the NLP 170.

The NLP 170 parses the natural language string provided by the user into discrete words which will be used by the Look-Up Table 180 to generate offset values, as discussed above, corresponding to the parsed words. For example, if the user enters the natural language string "I am having printing problems," in an exemplary embodiment, the NLP 170 will delete the words "I", "am", "having", and "problems" as being too generic. The NLP 170 will then parse the word "printing" into various forms, such as "print," "printer," and "printed." In an exemplary embodiment, the list created by the NLP 170 may be prioritized from a basic root word such as "print" to more narrow forms such as "printing." As illustrated in FIG. 5, the prioritized list of words parsed from the natural language string is then passed to the Look-Up Table 180 by the TSE 160.

After receiving the prioritized list of words from the NLP 170, the Look-Up Table 180 generates a list of offset values which correspond to the parsed words provided by the NLP 170. As will be understood by those skilled in the art, these offset values serve as position pointers to direct the TSP 110 to specific database locations in the Information Store (IS) 200, discussed below. In an exemplary embodiment, the Look-Up Table 180 generates offset values corresponding to the parsed words by a technique known as "hashing." As is well known to those skilled in the art, hashing is an indexing technique in which a value may be assigned to a character and may be numerically manipulated to calculate either the location of its associated record in a file or the starting point for a search for the associated record. If the character is part of a character string, such as a word, each character comprising the word may be assigned a numeric code to permit numerical manipulation.

Referring still to FIG. 5, the list of offset values generated by the Look-Up Table 180 are passed to the IS 200 via the Information Store Communicator (ISC) 190 to locate specific database positions in the IS 200. In an exemplary embodiment, the IS 200 is a database of problem solutions for provision to the user or for direct implementation by the TSP 110, as discussed below. In an exemplary embodiment, the database is arranged as a table including rows 221 of information, as illustrated in FIG. 5. In an exemplary embodiment, each data location contains particular problem solutions which may be offered by the TSP 110 to correct a problem encountered by the user.

The offset values generated by the Look-Up Table 180 may or may not translate directly into values that initially correspond to particular data locations in the IS 200. For example, an offset value of 118 may mean the 118th column or the 118th row in the IS 200 database. To implement this offset value and to check whether the offset value is valid or not, the ISC 190 translates the offset value into values which correspond to particular locations in the IS 200 database. For example, if "print" is the string provided by the user and that string corresponds to the 118th row, the ISC 190 will translate the offset value of 118 to mean the 118th row of data.

In an exemplary embodiment, the information located in the IS 200 is dynamic in that the information stored is capable of being updated without the need to re-download other components of the TSS 100, such as the CI 150 and the TSE 160. Accordingly as the providers of software applications develop more trouble shooting information, or as updated versions of particular software applications are developed, the IS 200 may be updated. It should be understood that the information contained in the IS 200 may be incrementally updated and increased as new information becomes available without the need to download a new version of the entire IS 200 database.

The IS 200 may require update when new versions of software applications or components of componentized software applications are released by providers of those applications. Likewise, the IS 200 may require update as providers of software applications continue to discover and develop solutions for problems occurring with their respective software applications. Updates to the IS 200 may be effected by downloading the new information to the IS 200 by conventional data storage media such as compact disks and floppy disks. Alternatively, in an exemplary embodiment of the present invention, updated information may be downloaded to the IS 200 via the Internet-based Information Store 300. As should be understood, updates may be downloaded to the Internet-based Information Store 300 by providers of software applications.

Referring still to FIG. 5, the offset values provided by the Look-Up Table 180 are used to direct the TSP 110 to specific data locations in the IS 200 via the ISC 190, as described above. For example, if the word "printer" is parsed from a natural language string provided by the user, as described above, the Look-Up Table 180 may generate an offset value of 118 for the word "printer." The TSE 160 then passes the offset value 118 to the IS 200 via the ISC 190, as described above. The ISC 190 locates data position 118 in the IS 200 according to the offset value 118 and provides the information located at that location 118 to the user through the CI 150.

In the present example, the information stored at data location 118 may include instructions to (1) check the size of the paper, and (2) check the orientation of the paper. In an exemplary embodiment, the data location corresponding to offset value 118 will also contain a number of different types of input the TSP 110 may receive back from the user.

For example, if the user is instructed to check the size of the paper, and the user responds that the paper is the correct size, the information contained in the IS 200 will have provided for that response from the user. That is, it should be understood that the data location in the IS 200 located according to the offset value provided by the Look-Up Table 180 will include values corresponding to user input. For example, if the printer offset is 118, as described above, the data location corresponding to offset value 118 may include additional values (e.g. 119, 120, 121 . . . , etc.) which may correspond to input from the user, such as "yes," "no," or other.

The TSP 110 will then immediately pass the second instruction to the user, that is, check the orientation of the paper. It should be understood that the return offset value corresponding to the user's response may also direct the TSP 110 to step back into the IS 200 to retrieve more information. In an exemplary embodiment, the initial list of problem solutions provided to the user by the TSP 110 may be placed in a hierarchy from simple to complex.

Once the user responds affirmatively to one of the suggested problem solutions, the return offset value to the IS 200 for the affirmative response will direct the TSP 110 to a data location within the IS 200 which contains the possible problem solution for the problem encountered and identified by the user. For example, if the user responds affirmatively that the paper orientation is incorrect, the affirmative response will return an offset value to the IS 200. In response to that return offset value, the TSP 110 will retrieve from the IS 200 and pass to the user through the CI 150, a possible problem solution, such as "Go to the format tool and select an alternative paper orientation."

Alternatively, and as briefly discussed above, the TSP 110 may automate part of the above described process by obtaining information directly from the software program 120 without input from the user. For example, instead of querying the user about the paper orientation where the user has identified a printing problem, the TSP 110, according to an alternate embodiment of the present invention, may query the software program 120 directly about the paper orientation. As illustrated in FIG. 4 and, as discussed above, the TSP 110 gets information from the software program 120 via interfaces, such as OLE component interfaces which are well known in the art.

Following with the present example where the user has identified a printing problem, the TSP 110, through the AFX 220, may query the software program 120 for an interface to the software program's printing functions. The software program 120 will return to the TSP 110 a pointer to the software program's printer interface. The TSP 110, using the pointer, will obtain various print functions from the software program's printer interface, including, for example, a function called "check paper orientation." The TSP 110 may then query that function to determine whether the paper orientation has been checked or changed. The response from the application will have an associated return value which has a corresponding offset value. The TSP 110 will use this offset value to locate additional problem solution information or queries in the IS 200 just as the TSP 110 does based on responsive user input, described in detail above. Accordingly, in the present example, the TSP 110 obviates the need to query the user as to whether the paper orientation has been checked. Therefore, instead of requiring user input, the TSP 110 can obtain some information directly from the software program 120.

In some cases the problem solution located in the IS 200 will require tools or functionality beyond the capability of the TSP 110. In such cases, the TSP 110 will direct the user to the Additional Tools 320 located on the Internet-based Trouble Shooting server 80*a*, as shown in FIG. 3. For example, the TSP 110 determines that the user's network is not setup properly to allow the user to access a remote printer. Consequently, the TSP 110 may ask the user to use a printer setup tool to accomplish the setup. If the user's machine does not have the tool for whatever reason, the user can ask the TSS 100 to pull the tool from the Internetbased Trouble Shooting server 80*a*. All the necessary tools for performing the corrective action will have to be downloaded from the server 80*a* to the user's computer 20, as discussed below.

As briefly discussed above, the CI 150 may provide the user with a menu of possible problems to select from. In the case of a menu of choices, the choices provided by the CI 150 are assigned specific offset values which correspond to data locations in the IS 200. That is, if the user selects a problem from the menu of choices provided by the CI 150, the TSE 160 is not required to parse a character string and provide offset values for a data location in the IS 200, as described above. The offset values corresponding to the menu of choices may be used by the TSP 110 to go directly to the IS 200 for location of problem solutions to be passed to the user.

In some cases, the TSP 10 may effect a solution to a problem for the user by direct implementation of problem solutions located in the IS 200. As discussed above, the TSP 110 stores information about the configuration of the user's computer 20 when the components of the TSS 100 are initially installed on the user's computer 20. If, for example, the user has a problem associated with a communication path between the components of a componentized software application, the TSP 110 may effect changes to overcome the problem without the assistance of the user, once the problem has been identified, as described in detail above. In an exemplary embodiment of the present invention, the user will have the option of manually effecting such corrections or allowing the TSP 110 to automatically effect the corrections upon identification thereof. IF the TSP 110 automatically effects any corrections, the user will be informed through the CI 150 of the corrections performed.

Additionally, in an exemplary embodiment, the user may request the TSP 110 to monitor commands given to the software application 120 by the user in the user's attempt to implement the software application 120. This monitoring preferably will be done through an OLE component interface as is well known to those skilled in the art. Once the user has requested monitoring, the TSS 100 will interface with the software application 120, as described above. As described above, the AFX 220 will be implemented for communicating application events to the TSS 100. Accordingly, the TSP 110 will gain information as to whether the user is erroneously operating the software application 120 or whether a problem exists with the software application 120. As with the menu of choices provided by the CI 150, if the TSP 110 determines the existence of a problem without the need of information from the user, the TSP 110 can pass a list of offset values corresponding to that known problem directly to the IS 200 for provision of solution parameters.

When TSP 110 is in a monitoring mode, it will launch the CI 150 and start the trouble shooting session. For example, a user using a word processing program receives an error that the CapsLock is activated. This error message will give the user an option of launching the TSP 100 to fix the problem. Because the TSP 110 has been launched for a specific error condition, it may, in an exemplary embodiment, attempt to isolate and correct the error without additional user input.

As discussed, the Internet-based Trouble Shooting site 75A may be used for on-line update of information contained in the IS 200 on the user's computer 20. If no affirmative response is returned by the user to any problem solution offered by the TSP 110, or if the offset value generated by the Look-Up Table 180 is outside the range of data locations contained in the IS 200, the TSP 110 will return an offset value to the IS 200 which will correspond to a request to the user to connect to the Internet-based Trouble Shooting site 75A. If the user answers the request affirmatively, the TSP 110 will connect the user's computer 20 to the Internet-based Trouble Shooting site 75*a* and ultimately to the Internet-based Trouble Shooting server 80*a*.

As illustrated in FIG. 3, the TSP 110 will communicate with the Internet-based Trouble Shooting site 75*a* via the Internet Manager 250. As should be understood the Internet Manager 250 is a software application component that facilitates connection of the user's computer 20 and the TSP 110 with the Internet-based Trouble Shooting site 75*a*. In an exemplary embodiment, the Internet Manager 250 serves to translate information between the Internet-based components of the TSS 100 and the local components of the TSS 100 when format differences exist between the Internetbased and the local components of the TSS 100.

As illustrated in FIG. 3, the TSP 110 will then download additional information from the Internet-based Information Store 300 to the IS 200. Accordingly, the TSP 110 will then provide additional problem solutions downloaded from the Internet-based Information Store 300 to the user. If the TSP 110 is still unable to provide an acceptable problem solution to the user, the TSP 110 will default to an offset value that corresponds to a recommendation that the user contact the provider of the malfunctioning software application 120 for assistance from the provider's product support services (PSS) personnel. It should be understood that if the user does not have the capability for connection with the Internet-based Trouble Shooting site 75A, the TSP 110 likewise will recommend that the user contact PSS personnel of the software application provider.

In an exemplary embodiment, The TSP 110 will store and maintain a log of all corrective steps taken to correct the user's problem. Particularly, each time an offset value is generated, the TSP 110 stores the offset value into a file. This file may be sent to the software application provider's PSS personnel by mail, electronic mail, or the user may call the PSS personnel and read the offset values to the PSS personnel. The PSS personnel will have access to the database included in the Internet-based Information Store 300 which normally would be available on the Internet Site 75a, but which is unavailable to the user.

Operation of an Exemplary Embodiment

Figure 6A:
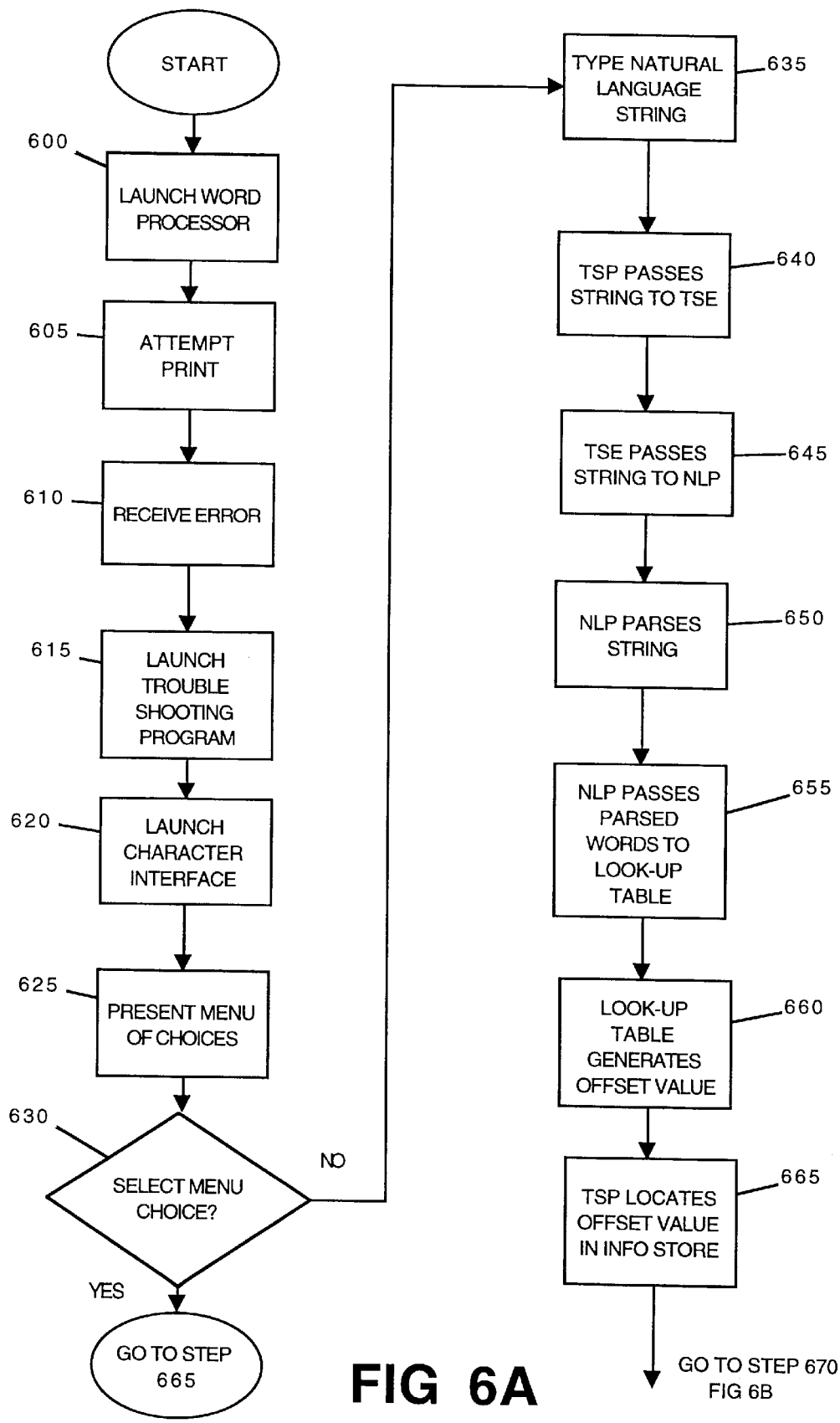
FIGS. 6A and 6B are flow diagrams illustrating the operation of an exemplary embodiment of the present invention.
Figure 6B:
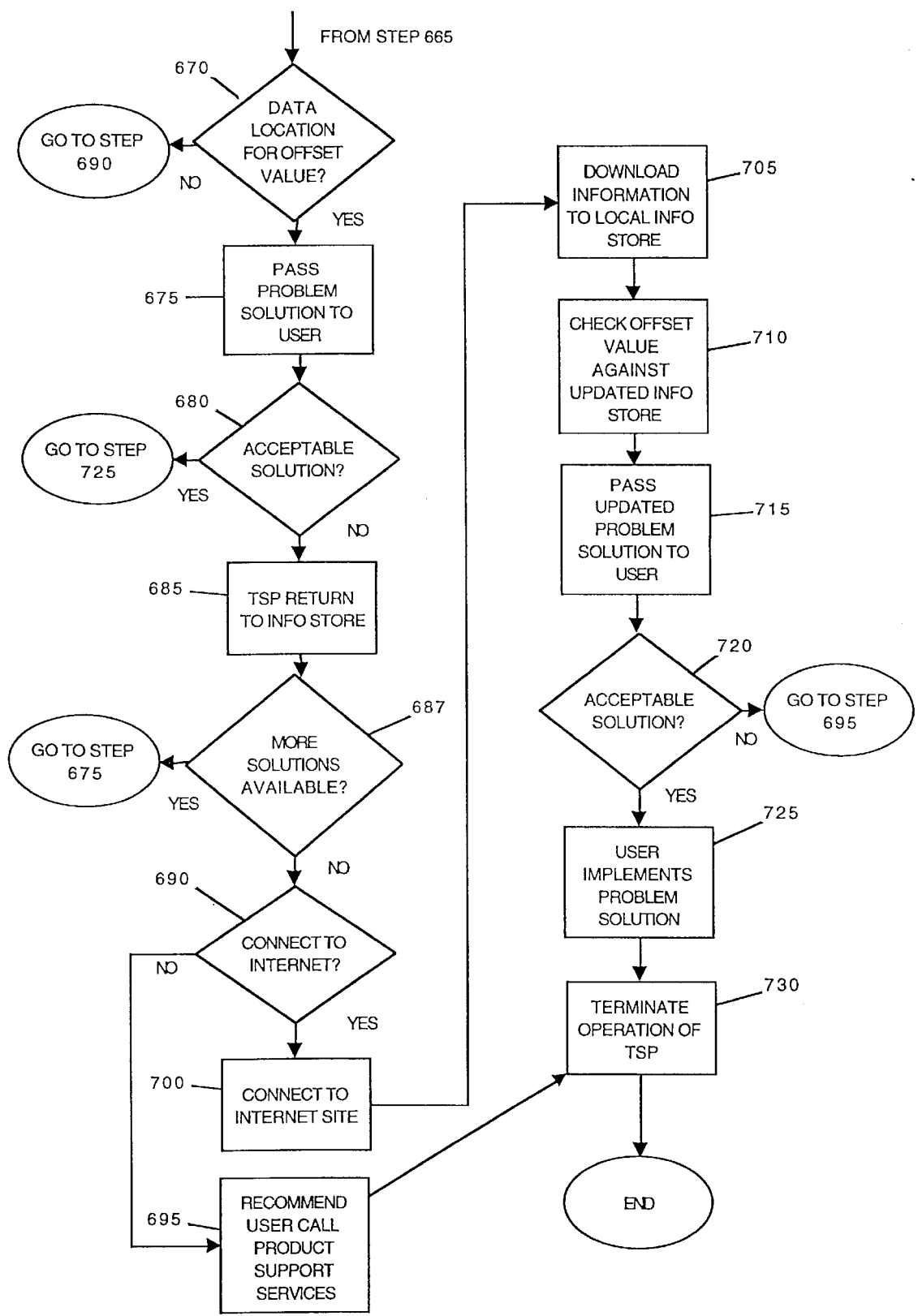

The method and system of an exemplary embodiment of the present invention is best illustrated by showing, as an example, how the method and system process a printing error encountered by a user of a word processing software application. Referring now to the drawings, FIGS. 6A and 6B are flow diagrams illustrating the operation of an exemplary embodiment of the present invention. Numbered components refer to FIGS. 1–5.

Referring now to FIG. 6A, at Step 600, a user launches a word processing software application onto the user's computer 20 for use in drafting a letter. At Step 605, the user attempts to print the letter using a printer (not shown) attached to the computer 20. At Step 610, the user receives an error message that the letter did not print to the attached printer. At Step 615, the user launches the TSP 110. Alternatively, if the TSS 100 is in a monitoring mode, as described above, then the TSS 100 may have already discovered the error condition and automatically launched the TSP 110.

In response, at Step 620, the CI 150 is launched by the TSP 110 and displays the statement "Welcome to the Troubleshooting System" onto the monitor of the user's computer 20. At Step 625, the CI 150 presents a menu of possible problems encountered by the user. If the menu of choices provided by the CI 150, at Step 625, contains the printer problem encountered by the user, the user may, if desired, select the choice corresponding to the problem the user has encountered. At decision Step 630, the user must decide whether to select from the menu of choices provided by the CI 150 or to type a natural language string. If the user selects from the menu of choices provided by the CI 150, the method follows the "YES" branch to Step 665, and the TSP 110 uses offset values pre-assigned to the choices contained in the menu to locate problem solutions in the Information Store 200.

In the present example, the user is unable to find a choice from the menu of choices which corresponds to the problem the user has encountered. Accordingly, the method follows the "NO" branch and proceeds to Step 635 where the user types in a natural language character string, such as "I am having printing problems." At Step 640, the TSP 110 passes the natural language string entered by the user to the TSE 160. At Step 645, and as illustrated in FIG. 5, the TSE 160 passes the natural language string to the NLP 170. At Step 650, the NLP 170 parses the natural language string entered by the user to create a list including the word "print."The list including the word "print" is passed from the NLP 170 to the Look-Up Table 180 at Step 655.

At Step 660, the Look-Up Table 180 generates an offset value 118 corresponding to the parsed word "print."As discussed above, the data location in the IS 200 corresponding to offset value 118 will also include return values corresponding to anticipated responses from the user. At Step 665, the TSP 110 uses the offset value 118 to locate a data position in the IS 200 via the ISC 190. Referring now to FIG. 6B, at Step 670, the TSP 110 checks the IS 200 database for a database entry matching the offset value 118. If no data location is found in the IS 200 corresponding to the offset value 118, the method follows the "NO" branch to Step 690, where the TSP 110 will recommend the user connect to the Internet-based Trouble Shooting site 75A to download additional problem solution information to the local Information Store 200.

In the present example, a database location is found in the IS 200 corresponding to the offset value 118, as illustrated in FIG. 5. Accordingly, the method follows the "YES" branch to Step 675. At Step 675, the TSP 110 passes the information located at the data location corresponding to the offset value 118 to the user. In the present example the information located at data location 118 in the IS 200, recommends the user check whether the printer has paper. At Step 680, the TSP 110, using the information provided from the IS 200 queries the user via the CI 150 as to whether the printer has paper.

If the user responds that the printer does not have paper, the user's response will correspond to an offset value provided with the set of values located in the IS 200 using the offset value provided by the Look-Up Table 180 for the user's problem. The return offset value corresponding to the user's response will be used by the TSP 110 to go to another location in the IS 200 to obtain an instruction to provide to the user to add paper to the printer. The method accordingly will follow the "YES" branch to Step 725, where the user will implement the problem solution and exit the Trouble Shooting Program 110.

However, in the present example, the user responds indicating that the printer does have paper which renders the problem solution offered by the TSP 110 unacceptable to correct the problem encountered by the user. At Step 685, a return value corresponding to the user's response causes the TSP 110 to return to the IS 200 for more information. At decision Step 687, the TSP 110 checks the data location 118 in the IS 200 for additional problem solutions. If additional problem solutions are available, the method follows the "YES" branch back to Step 675 and passes the additional problem solutions to the user.

In the present example, the TSP 110 finds no additional problem solutions in the IS 200. Accordingly, at Step 690, the TSP 110 returns a recommendation to the user that the user allow the TSP 110 to connect the user's computer 20 to the Internet-based Trouble Shooting site 75A to receive an update of the information contained in the IS 200 from the Internet-based Information Store 300 resident on the Trouble Shooting server 80A. If the user declines to be connected to the Internet-based Trouble Shooting site 75A, or if the user's computer 20 does not have Internet capabilities, the method follows the "NO" branch to step 695, where the TSP 110 recommends that the user contact the product support services of the provider of the user's word processing application.

In the present example, the user authorizes the TSP 110 to connect the user's computer 20 to the Internet-based Trouble Shooting site 75A. Accordingly, at Step 700, the TSP 110, through the IM 250, connects the user's computer 20 to the Internet-based Trouble Shooting site 75A. At Step 705, the TSP 110 downloads data contained in the Internet-based Information Store 300 resident at the Trouble Shooting server 80A to the local Information Store 200 on the user's computer 20.

Alternatively, the user may choose to query the Internet-based Information Store 300 on-line rather than downloading new data to the user's machine At Step 710, the original offset value 118 is checked against the updated data now contained in the IS 200, or alternatively, the offset value is checked on-line against the data contained in the Internet-based Information Store 300. Accordingly, at Step 715, an additional problem solution is passed to the user from the IS 200, in this case, or from the Internet-based IS 300, if desired to check the printer power source.

At Step 720, the user determines whether the problem solution is acceptable for correcting the problem. If the solution is not acceptable, the method follows the "NO" branch to step 695, as discussed above. If the problem solution is acceptable, the method follows the "YES" branch to step 725. At Step 725, the user checks the printer power source to find that the power cable to the attached printer has become disconnected, and accordingly, the user implements the problem solution. The user responds to the query in the affirmative that the power source was in fact the problem. In response to the affirmative response from the user, at Step 730, the operation of the method is terminated by the TSP 110.

Advantageously, the present invention provides a Trouble Shooting System for identifying and correcting problems encountered with computer software programs. The present invention provides for a user interactive Trouble Shooting Program, maintained on a user's computer, which maintains a database of problem solutions for use in identifying and correcting computer program problems. If required or desired, the Trouble Shooting Program may download additional problem solution information and tools from Internet-based components of the Trouble Shooting System.

While this invention has been described in detail with particular reference to exemplary embodiments thereof, it will be understood that variations and modifications can be effected within the spirit and scope of the invention as described herein and as defined in the appended claims.

What is claimed is:

1. A method of identifying and correcting a computer program problem, comprising the steps of:

receiving, at a Character Interface, identification information about said problem, said identification information including a natural language string describing said problem;

causing said Character Interface to provide said identification information to a Trouble Shooting Program;

causing said Trouble Shooting Program to send said natural language string to a Trouble Shooting Engine;

causing said Trouble Shooting Engine to send said natural language string to a Natural Language Parser;

causing said Natural Language Parser to parse said natural language string into a list of natural language words;

sending said list of natural language words to a Look-Up Table;

causing said Look-Up Table to generate offset values corresponding to each word of said list of natural language words;

causing said Trouble Shooting Program to use said offset values to locate a solution to said problem in an Information Store of problem solutions; and causing said Trouble Shooting Program to implement said solution to said problem.

2. The method recited in claim 1, wherein said Information Store of problem solutions is resident on a local computing device.

3. The method recited in claim 1, wherein said Information Store of problem solutions is resident on a remote server.

4. The method recited in claim 1, wherein said step of receiving, at a Character Interface, identification information about said problem, further comprises the step of receiving said natural language string from a menu of possible problems.

5. The method recited in claim 1, wherein said step of causing said Trouble Shooting Program to implement said solution to said problem, further comprises the steps of:

causing said Trouble Shooting Program to provide said solution through said Character Interface;

if said solution is acceptable, terminating operation of said Trouble Shooting Program; and if said solution is not acceptable, causing said Trouble Shooting Program to return to said Information Store of problem solutions to obtain a second solution to said problem.

6. The method recited in claim 5, further comprising the steps of:

prior to returning to said Information Store to obtain a second solution to said problem, downloading additional problem solutions to said Information Store;

after downloading said additional problem solutions, causing said Trouble Shooting Program to use said offset values to locate said second solution in said Information Store;

causing said Trouble Shooting Program to implement said second solution.

7. The method recited in claim 6, wherein said step of downloading additional problem solutions to said Information Store comprises the steps of:

interfacing said Trouble Shooting Program with a remote server via a distributed electronic network; and downloading said additional problem solutions from an Internet-based database of problem solutions resident on said remote server.

8. The method recited in claim 6, wherein said step of downloading additional problem solutions to said Information Store comprises:

downloading said additional problem solutions from a computer-readable data storage medium.

9. A system for identifying and correcting a computer program problem, comprising:

a Character Interface operative to receive identification information about a computer program problem, said identification information including a natural language string describing said computer program problem;

a Trouble Shooting Program operative
to interface with said computer program,
to send said natural language string to a Natural Language Parser;

said Natural Language Parser being operative
to parse said natural language string into a list of natural language words, and
to send said list of natural language words to a Look-Up Table;

said Look-Up Table being operative
to generate offset values corresponding to each word of said list of natural language words; and said Trouble Shooting Program being further operative
to use said offset values to locate a solution to said problem in a database of problem solutions, and
to implement said solution to correct said computer program problem.

10. The system of claim 9, wherein said Character Interface is further operative to provide a selectable menu of possible computer program problems.

11. The system of claim 9, wherein said Trouble Shooting Program is further operative
to interface with a remote server via the Internet; and
to download additional problem solution resources to said database of problem solutions.

12. A computer-readable medium on which is stored a Trouble Shooting Program for identifying and correcting a computer program problem, said Trouble Shooting Program comprising instructions which, when executed by a computer, perform the steps of:

receiving identification information about said problem via a Character Interface;

causing said Character Interface to provide said identification information to a Trouble Shooting Engine;

causing said Trouble Shooting Engine to generate offset values corresponding to said identification information;

if said identification information is received in the form of a natural language string, parsing said natural language string into a list of natural language words;

passing said list of natural language words to a Look-Up Table; and causing said Look-Up Table to generate offset values corresponding to each word of said list of natural language words;

using said offset values generated by said Trouble Shooting Engine to locate a solution to said problem in a database of problem solutions; and implementing said solution to said problem.

13. The computer-readable medium of claim 12, wherein said step of implementing said solution to said problem, further comprises the step of:

if said solution does not correct said problem, downloading additional problem solutions to said database of problem solutions from a remote server via the Internet.

\* \* \* \* \*